United States Patent [19]

Silver

[11] 3,957,317
[45] May 18, 1976

[54] SHAPED FOIL BEARING
[75] Inventor: Alexander Silver, Tarzana, Calif.
[73] Assignee: The Garrett Corporation, Los Angeles, Calif.
[22] Filed: May 21, 1975
[21] Appl. No.: 579,749

[52] U.S. Cl. .................................. 308/9; 308/121; 308/DIG. 1
[51] Int. Cl.² ........................................ F16C 17/16
[58] Field of Search ............... 308/9, 121, 122, 123, 308/DIG. 1

[56] References Cited
UNITED STATES PATENTS
3,382,014  5/1968  Marley .................................. 308/9
3,795,427  3/1974  Licht et al. ........................... 308/9

Primary Examiner—M. H. Wood, Jr.
Assistant Examiner—Gene A. Church
Attorney, Agent, or Firm—Albert J. Miller

[57] ABSTRACT

Disclosed is a shaped foil for use in a hydrodynamic or hydrostatic foil bearing system.

16 Claims, 5 Drawing Figures

SHAPED FOIL BEARING

BACKGROUND OF THE INVENTION

Fluid or gas bearings have recently been utilized in a large number of diverse applications. These fluid bearings generally comprise two relatively movable elements with a predetermined spacing therebetween. The spacing is filled with a fluid such as air, which, under dynamic conditions forms a supporting wedge to provide sufficient support for a load by preventing contact between the two relatively movable elements.

More recently, improved fluid bearings, particularly gas bearings of the hydrodynamic type, have been developed by providing foils in the space between the relatively rotatable bearing elements. Such foils, which are generally thin sheets of a compliant material, may be deflected by the hydrodynamic film forces between adjacent bearing surfaces and the foils. The foils enhance the hydrodynamic characteristics of the fluid bearings and also provide improved operation under extreme load conditions when normal bearing failure might otherwise occur. Additionally, foils provide the added advantage of accommodating eccentricity of the relatively movable elements and further provide a cushioning and dampening effect.

The ready availability of relatively clean process fluid air or ambient atmosphere as the bearing fluid makes these hydrodynamic, fluid film lubricated, bearings particularly attractive for high speed rotating machinery. While in many cases these hydrodynamic or self-acting fluid bearings provide sufficient load bearing capacity solely from the pressure generated in the fluid film by the relative motion of the two converging surfaces, it is sometimes necessary to externally pressurize the fluid between the bearing surfaces to increase the load carrying capacity. While these externally pressurized or hydrostatic fluid bearings do increase the load carrying capacity they do introduce the requirement for an external source of fluid under pressure.

A major disadvantage with both hydrodynamic and hydrostatic foil bearings, is that the load capacity does not increase indefinitely with speed but tends to level off or approach a fixed value. Thus, for a given load, these bearings are useful up to a given speed beyond which failure would be likely to occur. In addition, the distribution of fluid across the length of the bearing may be such as to create hot spots or the like.

Examples of hydrodynamic and/or hydrostatic bearings assigned to the Assignee of this application are U.S. Pat. Nos. 3,215,479, 3,215,480, 3,366,427, 3,375,046, 3,382,014, 3,434,761, 3,434,762, 3,467,451, 3,511,544, 3,560,064, 3,615,121, 3,635,534, 3,642,331, 3,677,612.

SUMMARY OF THE INVENTION

The invention is directed to shaping the trailing edge of the compliant foils in either a hydrodynamic or hydrostatic fluid bearing system to create a pumping of fluid in the groove formed between overlapping foils. A herringbone or chevron shaped groove will guide or direct the fluid inwardly during relative rotation of the bearing elements. This guiding or pumping of the fluid toward the center of the bearing serves to increase the fluid pressure in the bearing and also to insure that sufficient fluid is provided at the bearing center. Since more fluid is pumped toward the center as the relative rotational speed increases, the load capacity of the bearing is increased with higher speeds. A biased groove will serve to ventilate the bearing.

DESCRIPTION OF THE PREFERRED EMBODIMENTS

Figure 1:
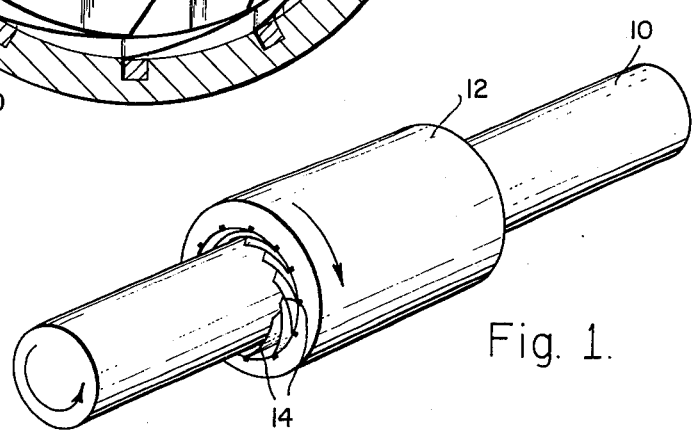
FIG. 1 is a schematic representation of the foil bearing arrangement of the present invention.

As generally illustrated in FIG. 1, the hydrodynamic foil bearing system generally comprises a concentrically arranged shaft 10 and bushing 12 with a plurality of overlapping resilient foils 14 disposed in the space therebetween. The plurality of individual foils 14 may be affixed to the interior of the bushing 12 as generally illustrated in FIG. 1, or alternately affixed around the exterior of the shaft 10. Likewise both the shaft 10 and bushing 12 may be independently rotatable or one may be stationary. Further, it should be noted that the shaft 10 may be hollow and thus serve as a source of pressurized fluid to transform the bearing system into a pressurized or hydrostatic system such as generally described in U.S. Pat. No. 3,366,427.

Figure 2:
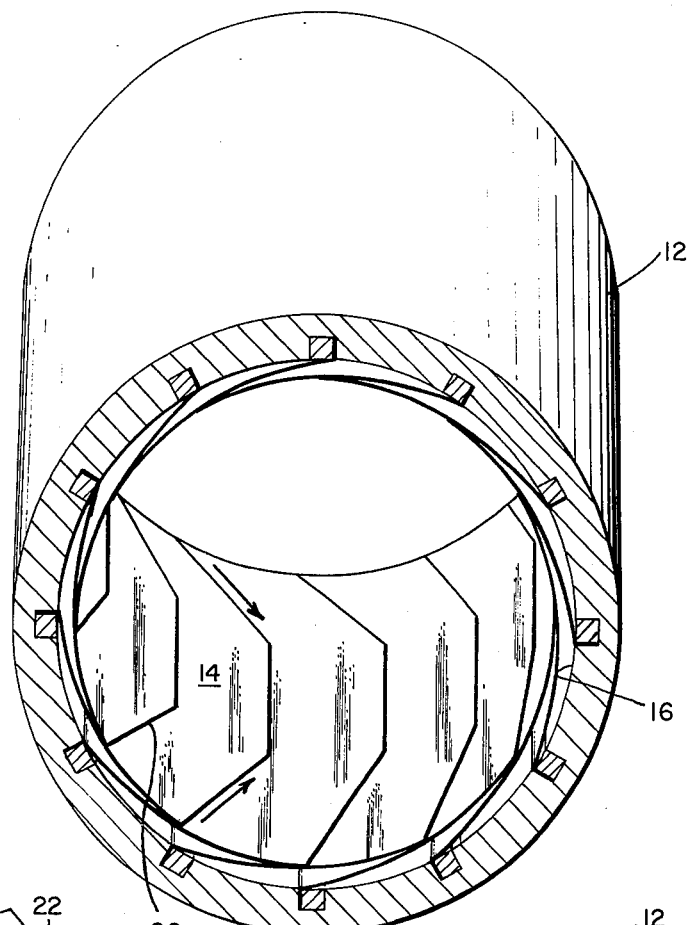
FIG. 2 is an enlarged perspective end view of the bushing of FIG. 1.

In FIG. 2, the bushing 12 is illustrated in an enlarged perspective view. The individual foils 14 are shown affixed to the interior surface 16 of the bushing 12. The individual foils 14, of a thin compliant metal are spaced around the interior surface 16 of the bushing 12 in an overlapping fashion, that is, each foil overlapping the next adjacent foil. The foils 14 may be affixed to the bushing in any conventional manner, for example as illustrated in U.S. Pat. No. 3,615,121. Also, the foils may be coated with a solid lubricant, such as disclosed in U.S. Pat. No. 3,677,612, to minimize friction at low speeds.

As best illustrated in FIG. 2, the trailing or free edge 18 of the foils 14, as a result of the thickness thereof, forms a groove 20 between adjacent overlapping foils. It is the shape of this grove 20 which pumps fluid toward the center of the bearing (as indicated by arrows in FIG. 2) thereby insuring that adequate fluid is provided to the bearing center and increasing the fluid pressure in the bearing. As the relative rotation between the shaft 10 and bushing 12 increases, more fluid is pumped by this plurality of grooves 20. The direction of relative rotation between the shaft 10 and bushing 12 is such that a drag is produced on the free end 18 of the foils 14 with respect to the fixed ends thereof.

Figure 3:
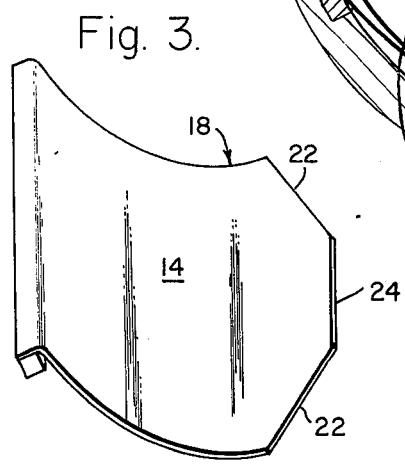
FIG. 3 is a perspective view of an individual bearing foil having a herringbone shaped trailing edge.
Figure 4:
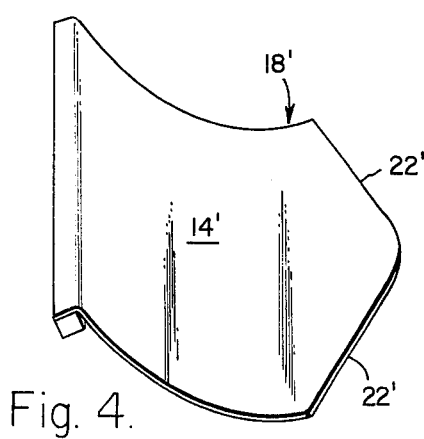
FIG. 4 is a perspective view of an individual bearing foil having generally a chevron shaped trailing edge.

An individual foil 14 having a shaped trailing edge 18 to produce a herringbone groove between overlapping foils is illustrated in FIG. 3. The trailing edge 18 is shaped or contoured to produce tapered corners 22 on either side of the straight center portion 24 of the trailing edge 18. As illustrated in FIG. 4, the tapered corners 22′ may be extended to the center of the foil to eliminate the straight center portion and produce a generally chevron shaped trailing edge 18′.

With either a herringbone or chevron type trailing edge, a plurality of grooves are defined between the overlapping foils. These grooves will pump fluid towards the center of the bearing and thereby increase the lubricant pressure therein. Since the load-carrying capacity is directly related to the pressure distribution within the bearing, the bearing capacity is increased. With more fluid being pumped as the rotational speed of the bearing increases, the bearing capacity actually increases with speed.

In a bearing having a relatively large length/diameter ratio, the center of conventional foil bearings may be starved for fluid which can result in a hot spot and eventual bearing failure. The pumping of fluid towards the bearing center can alleviate this problem in this type of bearing.

Figure 5:
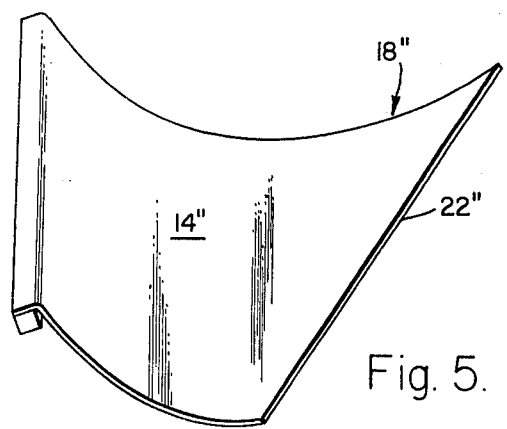
FIG. 5 is a perspective view of an individual bearing foil having a biased trailing edge.

In addition to shaping the trailing edge of the bearing foil to accomplish the pumping of fluid towards the center of the bearing, the trailing edge 18" of the bearing foil 14" may be shaped or biased as shown in FIG. 5 to provide for the guiding or pumping of fluid along the bearing length. The tapered or biased edge 26 will form a plurality of biased grooves around the inner surface of the bushing which can serve to pump fluid along the length of the bushing to ventilate the bearing.

In a pressurized or hydrostatic bearing, such as is illustrated in U.S. Pat. No. 3,366,427, issued to Alexander Silver and David J. Marley on Jan. 30, 1968, tapering or biasing the trailing edge of the bearing foil as illustrated in FIGS. 2, 3, or 4, will reduce the cogging effect which can be present in this type of bearing system when the normally straight trailing edge passes across the holes or openings in the hollow shaft which provide the pressurized fluid to the bearing system. The generally aligned openings are then sequentially exposed rather than a single row of openings all exposed at the same time.

While specific embodiments of the invention have been illustrated and described, it is to be understood that these are provided by way of example only and that the invention is not to be construed as being limited thereto but only by the proper scope of the following claims.

What I claim is:

1. In combination:
   a pair of members arranged for relative rotation with respect to one another, one of said pair of members adapted to rotatively support the other; and
   a compliant foil bearing operably disposed between said pair of relatively rotatable members, said compliant foil bearing comprising a plurality of overlapping compliant foils mounted on one of said pair of members and including means at the free ends thereof to induce the flow of fluid across the plurality of foils.

2. In combination:
   a pair of members arranged for relative rotation with respect to one another, one of said pair of members being adapted to rotatively support the other; and
   a plurality of compliant, overlapping, bearing foils operably disposed between said pair of relatively rotatable members, each of said plurality of foils having a fixed end mounted on one of said pair of relatively rotatable members and a free end extending between said pair of members and overlapping an adjacent foil, each of said plurality of foils including means at the free end thereof to induce the flow of fluid across the foils.

3. In combination:
   a pair of members arranged for relative rotation with respect to one another, one of said pair of members being adapted to rotatively support the other; and
   a plurality of compliant, overlapping, bearing foils operably disposed between said pair of relatively rotatable members, each of said plurality of foils having a fixed end mounted on one of said pair of relatively rotatable members and a free and extending between said pair of members, the free end of each of said plurality of foils having at least a portion thereof disposed at an angle with respect to the axis of the relative rotation of said pair of members to establish a groove with the overlapped foil to induce the flow of fluid thereacross.

4. The combination of claim 3 in which the free end of each of said plurality of foils is angled to establish a plurality of generally herringbone-shaped grooves between overlapping foils to induce the flow of fluid towards the center of the bearing foils.

5. The combination of claim 3 in which the free end of each of said plurality of foils is angled to establish a plurality of generally chevron-shaped grooves between overlapping foils to induce the flow of fluid towards the center of the bearing foils.

6. The combination of claim 3 in which te entire free end of each of said plurality of foils is angled along its entire length.

7. In combination:
   a bearing support member having an opening to receive a rotatable shaft;
   a rotatable shaft operably disposed within the opening in said bearing support member; and
   a compliant foil bearing operably disposed between the rotatable shaft and the bearing support member, said compliant foil bearing comprising a plurality of compliant, overlapping, foils mounted within the rotatable shaft receiving opening in the bearing support member and including means to induce the flow of fluid towards the center of said bearing.

8. The combination of claim 7 in which said means to induce the flow of fluid towards the center of said bearings comprises a plurality of generally chevron-shaped grooves formed between overlapping foils.

9. The combination of claim 7 in which said means to induce the flow of fluid towards the center of said bearings comprises a plurality of generally herringbone-shaped grooves formed between overlapping foils.

10. The combination of claim 7 in which said plurality of compliant, overlapping, foils are mounted in the shaft receiving opening in said bearing support member.

11. A method of supporting relative rotation between two members, one of which being supportive of the other, comprising the steps of:
    providing a plurality of compliant, overlapping, foils between the two members;
    mounting one end of each of said compliant foils on one of said members with the free end of each of said plurality of foils extending between said two members; and
    inducing, at the free end of each of said overlapping foils, the flow of fluid across said foils.

12. The method of claim 11 wherein the flow of fluid at the free end of each of said overlapping foils is induced to flow towards the center of the foils.

13. A compliant foil for use in a foil bearing system, said foil comprising:

a generally arcuate-shaped, compliant member including mounting means at one end thereof and at least a portion of the other end angled with respect to the end including said mounting means.

14. The compliant foil of claim 13 wherein the other end of the compliant member is generally herringbone-shaped.

15. The compliant foil of claim 13 wherein the other end of the compliant member is generally chevron-shaped.

16. The compliant foil of claim 13 wherein the other end of the compliant member is angled across the entire length thereof.

* * * * *